(12) United States Patent
Liu et al.

(10) Patent No.: US 11,055,869 B2
(45) Date of Patent: Jul. 6, 2021

(54) SECURITY INSPECTION BASED ON SCANNED IMAGES

(71) Applicant: NUCTECH COMPANY LIMITED, Beijing (CN)

(72) Inventors: Bicheng Liu, Beijing (CN); Haoran Zhang, Beijing (CN); Guangming Xu, Beijing (CN); Qi Wang, Beijing (CN); Qiangqiang Zhu, Beijing (CN); Yuan Wo, Beijing (CN)

(*) Notice: Subject to any disclaimer, the term of this patent is extended or adjusted under 35 U.S.C. 154(b) by 228 days.

(21) Appl. No.: 16/226,645

(22) Filed: Dec. 20, 2018

(65) Prior Publication Data

US 2019/0197721 A1 Jun. 27, 2019

(30) Foreign Application Priority Data

Dec. 26, 2017 (CN) .......................... 201711431607.5

(51) Int. Cl.
| | | |
|---|---|---|
| *G06T 19/00* | (2011.01) | |
| *G06T 7/70* | (2017.01) | |
| *G06T 15/00* | (2011.01) | |
| *G01V 5/00* | (2006.01) | |

(52) U.S. Cl.
CPC .............. *G06T 7/70* (2017.01); *G01V 5/0016* (2013.01); *G06T 15/005* (2013.01); *G06T 19/006* (2013.01); *G06T 2200/04* (2013.01)

(58) Field of Classification Search
None
See application file for complete search history.

(56) References Cited

U.S. PATENT DOCUMENTS

| | | | |
|---|---|---|---|
| 7,783,118 B2 * | 8/2010 | Zhou | .......................... G06T 7/11 |
| | | | 382/236 |
| 8,406,520 B2 * | 3/2013 | Henkel | ................ G01V 5/0008 |
| | | | 382/173 |
| 2016/0178790 A1 | 6/2016 | Li et al. | |

(Continued)

FOREIGN PATENT DOCUMENTS

| | | |
|---|---|---|
| CA | 2802226 A1 | 8/2013 |
| CN | 103745198 A | 4/2014 |

(Continued)

OTHER PUBLICATIONS

Hill L et al: "3-D Liquid Crystal Displays and Their Applications", Proceedings of the IEEE, IEEE. New York, US, vol. 94, No. 3, Mar. 1, 2006 (Mar. 1, 2006 ), pp. 575-590, XP011442712, ISSN: 0018-9219, DOI: 10.1109/JPROC.2006.870695.

(Continued)

*Primary Examiner* — Tahmina N Ansari (74) *Attorney, Agent, or Firm* — Kilpatrick Townsend & Stockton, LLP (57) ABSTRACT

The present disclosure discloses a method, apparatus and system for assisting security inspection, and relates to the field of security inspection. The method includes: acquiring registration information of an inspected object; acquiring a standard scanned image corresponding to the registration information; displaying the standard scanned image in an AR manner to determine whether the inspected object is a suspicious object through comparing the standard scanned image with an actual scanned image, the actual scanned image comprising an image of the inspected object.

20 Claims, 5 Drawing Sheets

(56) References Cited

U.S. PATENT DOCUMENTS

| | | |
|---|---|---|
| 2016/0209335 A1 | 7/2016 | Jimenez, Jr. et al. |
| 2017/0147619 A1 | 5/2017 | Dow et al. |
| 2017/0255648 A1* | 9/2017 | Dube .................. G06K 9/6201 |
| 2017/0346634 A1 | 11/2017 | Hoyer et al. |
| 2019/0197721 A1* | 6/2019 | Liu ........................ G06T 7/70 |

FOREIGN PATENT DOCUMENTS

| | | |
|---|---|---|
| CN | 104750697 A | 7/2015 |
| CN | 105372712 A | 3/2016 |
| CN | 105615831 A | 6/2016 |
| CN | 105787495 A | 7/2016 |
| CN | 106443806 A | 2/2017 |
| CN | 106503121 A | 3/2017 |
| CN | 107228867 A | 10/2017 |
| EP | 3035087 A1 | 6/2016 |
| WO | 2016107474 A1 | 7/2016 |

OTHER PUBLICATIONS

EP Search Report dated May 23, 2019 in the corresponding EP application (application No. 18213545.9).
CN First Office Action dated Nov. 15, 2019 in the corresponding CN application (applicasiton No. 201711431607.5).

* cited by examiner

SECURITY INSPECTION BASED ON SCANNED IMAGES

CROSS-REFERENCES TO RELATED APPLICATIONS

The present disclosure is based on and claims the priority to the Chinese Patent Application No. 201711431607.5 filed on Dec. 26, 2017, the disclosure of which is incorporated hereby as a whole into the present disclosure.

FILED

The present disclosure relates to the field of security inspection, and in particular to a method, apparatus and system for assisting security inspection.

BACKGROUND

The use of containers or vehicles for smuggling, for example, smuggling of contraband such as drugs, explosives and even weapons of mass destruction and radioactive dispersion devices, has become an international public nuisance that disturbs governments and interferes with the normal order of international cargo transportation. Cargo/vehicle security inspection is a topic of common concern all over the world. X-ray fluoroscopy imaging technology is the most basic and earliest widely used technology in the field of contraband inspection, and it is still the most widely used inspection technology for containers, cargos and vehicles in the world.

X-ray fluoroscopic images differ greatly from natural light images, and X-ray fluoroscopic images of various cargos taken from different angles are not well known to most people. In order to effectively carry out image screening, an image screening inspector must acquire a large amount of commodity knowledge through experience accumulation or training to have a prejudgment on the X-ray fluoroscopic images of various cargos.

SUMMARY

According to an aspect of the present disclosure, a method for assisting security inspection is provided, comprising: acquiring registration information of an inspected object; acquiring a standard scanned image corresponding to the registration information; displaying the standard scanned image in an Augmented Reality (AR) manner to determine whether the inspected object is a suspicious object through comparing the standard scanned image with an actual scanned image, the actual scanned image comprising an image of the inspected object.

In some embodiments, the method further comprises: acquiring at least one of a three-dimensional model or descriptive information corresponding to the registration information; displaying at least one of the three-dimensional model or the descriptive information corresponding to the registration information in an AR manner.

In some embodiments, the method further comprises: acquiring an actual scanned image marked with a suspicious area, wherein if the inspected object is a suspicious object, a location at which the image of the inspected object is displayed in the actual scanned image is marked as the suspicious area; displaying the actual scanned image marked with the suspicious area on a container in which the inspected object is placed in an AR manner.

In some embodiments, the method further comprises: displaying at least one of the standard scanned image, a three-dimensional model, or descriptive information corresponding to the registration information on the container in which the inspected object is placed in an AR manner.

In some embodiments, the method further comprises: acquiring at least one of a standard scanned image, a three-dimensional model or descriptive information of the suspicious object; displaying at least one of the standard scanned image, the three-dimensional model or the descriptive information of the suspicious object in an AR manner.

In some embodiments, the method further comprises: performing image processing on at least one of the standard scanned image corresponding to the registration information or the standard scanned image of the suspicious object in response to an image processing instruction, and displaying the processed standard scanned image in an AR manner.

In some embodiments, the method further comprises: performing at least one of a zooming operation or a rotating operation on at least one of the three-dimensional model corresponding to the registration information or the three-dimensional model of the suspicious object in response to a model processing instruction, and displaying the three-dimensional model subjected to the model operation in an AR manner.

In some embodiments, the standard scanned image is a multi-angle standard X-ray scanned image.

According to another aspect of the present disclosure, an apparatus for assisting security inspection is provided, comprising: an input interface configured to acquire registration information of an inspected object; a processor configured to acquire a standard scanned image corresponding to the registration information; and a display configured to display the standard scanned image in an AR manner to determine whether the inspected object is a suspicious object through comparing the standard scanned image with an actual scanned image, the actual scanned image comprising an image of the inspected object.

In some embodiments, the processor is further configured to acquire at least one of a three-dimensional model or descriptive information corresponding to the registration information; the display is further configured to display at least one of the three-dimensional model or the descriptive information corresponding to the registration information in an AR manner.

In some embodiments, the input interface is further configured to acquire the actual scanned image marked with a suspicious area, wherein if the inspected object is a suspicious object, a location at which the image of the inspected object is displayed in the actual scanned image is marked as the suspicious area; the display is further configured to display the actual scanned image marked with the suspicious area on a container in which the inspected object is placed in an AR manner.

In some embodiments, the display is further configured to display at least one of the standard scanned image, the three-dimensional model, or the descriptive information corresponding to the registration information on the container in which the inspected object is placed in an AR manner.

In some embodiments, the processor is further configured to acquire at least one of a standard scanned image, a three-dimensional model or descriptive information of a suspicious object; the display is further configured to display at least one of the standard scanned image, the three-dimensional model or the descriptive information of the suspicious object in an AR manner.

In some embodiments, the processor is further configured to perform image processing on at least one of the standard scanned image corresponding to the registration information or the standard scanned image of the suspicious object in response to an image processing instruction; the display is further configured to display the processed standard scanned image in an AR manner.

In some embodiments, the processor is further configured to performing at least one of a zooming operation or a rotating operation on at least one of a three-dimensional model corresponding to the registration information or the three-dimensional model of the suspicious object in response to a model processing instruction; the display is further configured to display the three-dimensional model subjected to the model operation in an AR manner. In some embodiments, the standard scanned image is a multi-angle standard X-ray scanned image.

According to still another aspect of the present disclosure, a system for assisting security inspection is provided, comprising: a server, a database and the apparatus for assisting security inspection described above.

In some embodiments, the server is configured to store at least one of standard scanned images or three-dimensional models; the database is configured to store addresses of the standard scanned images and the three-dimensional models in the server, as well as descriptive information corresponding to the registration information and descriptive information of the suspicious objects.

According to still another aspect of the present disclosure, a device for assisting security inspection is provided, comprising: a memory; and a processor coupled to the memory, the processor configured to carry out the method for assisting security inspection described above based on instructions stored in the memory.

According to still another aspect of the present disclosure, a computer-readable storage medium is provided on which computer program instructions are stored, which when executed by a processor implement the steps of the method for assisting security inspection described above.

Other features and advantages of the present disclosure will become clear through detailed descriptions of the illustrative embodiments of the present disclosure with reference to the following drawings.

BRIEF DESCRIPTION OF THE DRAWINGS

The accompanying drawings, which are incorporated in and constitute a part of this specification, illustrate embodiments of the present disclosure and, together with the description, serve to explain the principles of the present disclosure.

The present disclosure will be more clearly understood from the following detailed description with reference to the accompanying drawings, in which.

DETAILED DESCRIPTION

Various illustrative embodiments of the present disclosure will now be described in details with reference to the drawings. It should be noted that unless otherwise illustrated, respective arrangements, mathematic expressions and values of the components and steps illustrated in these embodiments do not limit the scope of the present disclosure.

Meanwhile, it shall be understood that in order to facilitate description, the respective parts shown in the drawings are not drawn in sizes according to actual proportional relations.

The following descriptions on at least one illustrative embodiment are actually illustrative, but shall not be any limitation on the present disclosure or its application or use.

Techniques, methods and devices that have already been known to ordinary technicians in the art may not be discussed here in detail, but under suitable circumstances, the techniques, methods and devices shall be deemed as parts of the granted description.

In the embodiments shown and discussed here, any specific value shall be interpreted as only illustrative, instead of limitative. Hence, other embodiments of the illustrative embodiments may have different values.

It shall be noted that similar marks and characters represent similar items in the following figures, so once a certain item is defined in one figure, no further discussion on it is required in the following figures.

To make the object, technical solutions and advantages of the present disclosure clearer, the present disclosure is further explained in details by combining specific embodiments and referring to the drawings.

Figure 1:
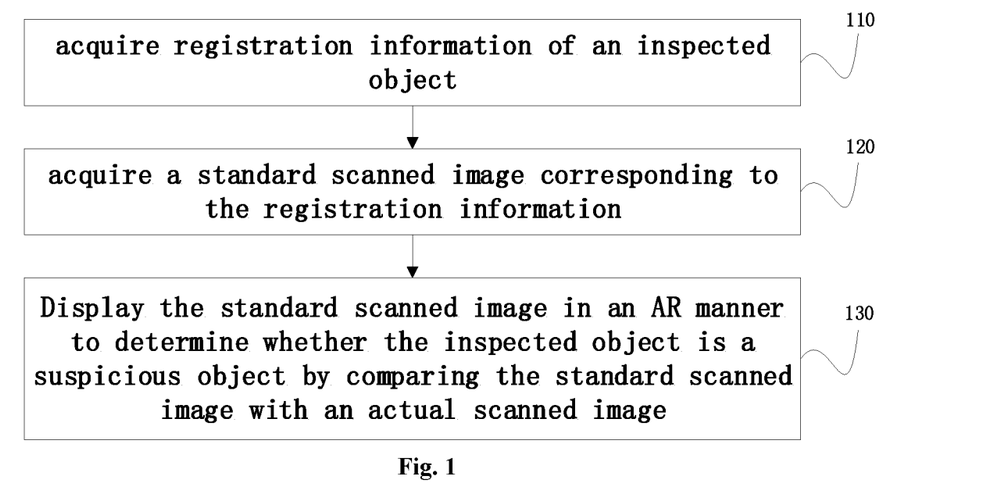
FIG. 1 is a schematic flow chart of a method for assisting security inspection some embodiments of the present disclosure.

FIG. 1 is a schematic flow chart of a method for assisting security inspection some embodiments of the present disclosure.

At step 110, registration information of an inspected object is acquired. The inspected object may be a specific cargos item in a container, wherein the container may be, for example, a vehicle, a container case, a package, or the like.

In the inspection of a container case, names of cargos items listed in the customs declaration can be obtained by checking the customs declaration, and the names of cargos items are the registration information of the cargos items.

At step 120, a standard scanned image corresponding to the registration information is acquired. Multi-angle standard X-ray scanned images of various cargos items can be stored in memory in advance, and the multi-angle standard X-ray scanned image of a cargos item can be retrieved from the memory by the name of the cargos item. For example, if the customs declaration shows that there is a brand of mobile phone in a container case being checked, a corresponding multi-angle standard X-ray scanned image can be retrieved by the name of the brand of mobile phone.

At step 130, the standard scanned image is displayed in an AR (Augmented Reality) manner to determine whether the inspected object is a suspicious object by comparing the standard scanned image with an actual scanned image, wherein the actual scanned image includes an image of the inspected object.

In recent years, AR technology has developed rapidly, by which the digital virtual world has been seamlessly connected with the real world, bringing a new visual experience and interaction to human beings. In the embodiment of the present disclosure, the AR technology is applied to the field of security inspection. For example, when a cargo container is passing through a security inspection device, a security inspector wearing an AR device can see a multi-angle standard X-ray scanned image of a cargos item in the cargo container at a predetermined position by means of the AR device. At the same time, the security inspector can also see a current X-ray scanned image containing the cargos item in the cargo container. By comparing the multi-angle standard X-ray scanned image of the cargos item with the current X-ray scanned image, it can be determined whether the cargos item is a suspicious object.

In this embodiment, through acquiring a standard scanned image corresponding to the registration information based on the registration information of the inspected object and displaying the standard scanned image in an AR manner, a security inspector can determine whether the inspected object is a suspicious object by comparing the standard scanned image with an actual scanned image. The security inspector's demand for cargos knowledge can be satisfied, by providing a guide to image screening, the accuracy of image screening can be improved.

Figure 2:
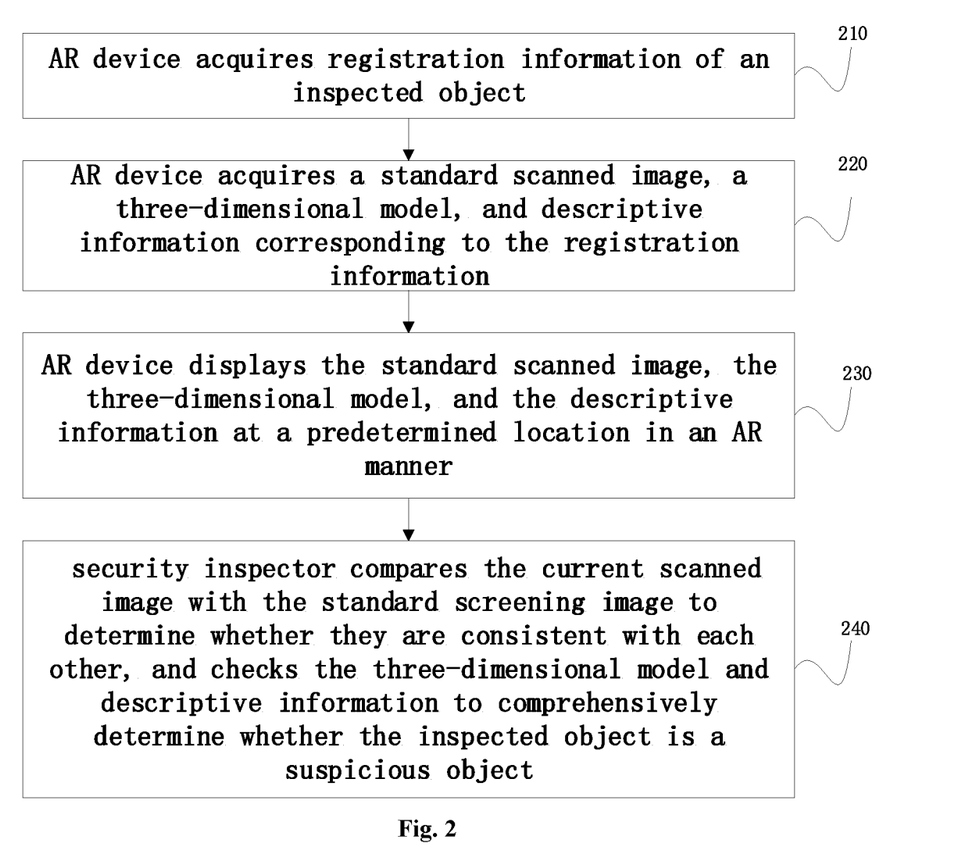
FIG. 2 is a schematic flow chart of a method for assisting security inspection some other embodiments of the present disclosure.

FIG. 2 is a schematic flow chart of a method for assisting security inspection some other embodiments of the present disclosure. An AR device is worn by the security inspector, and the AR device is, for example, a pair of AR glasses. The security inspector in this embodiment may be a human being or an automated device.

At step 210, the AR device acquires registration information of an inspected object.

At step 220, the AR device acquires a standard scanned image, a three-dimensional model, and descriptive information corresponding to the registration information. The descriptive information comprises the name, quantity, definition, usage, characteristic parts on the scanned image, commonly used packaging materials of the inspected object, and the like.

At step 230, the AR device displays the standard scanned image, the three-dimensional model, and the descriptive information at a predetermined location in an AR manner. An identification label can be set at a predetermined location, and the AR device calculates feature points for each frame image captured by a camera, identifies the predetermined location by comparing with feature points of the identification label. Then, the standard scanned image, the three-dimensional model and the descriptive information can be displayed in an AR manner at the predetermined location. In addition, the AR device can also move the display location of the standard scanned image, the three-dimensional model and the descriptive information in response to a gesture movement instruction, so as to facilitate viewing of the security inspector.

At step 240, the security inspector can compare the current scanned image with the standard scanned image to determine whether they are consistent with each other, and check the three-dimensional model and descriptive information to comprehensively determine whether the inspected object is a suspicious object. For example, if the customs declaration shows that the inspected object is a kind of mobile phone, the security inspector wearing an AR device can view the standard scanned image, the three-dimensional model and the descriptive information of the mobile phone at a predetermined location. However, if a pistol shape is shown in the current scanned image, it is determined that the inspected object does not match the information of the customs declaration, and the inspected object may be a suspicious object.

In this embodiment, the standard scanned image, the three-dimensional model and the descriptive information are displayed at a predetermined location in an AR manner, which can assist the security inspector in image screening, satisfy the security inspector's demand for commodity knowledge, and reduce the training cost of the security inspector. By providing a guide to image screening, the accuracy of image screening can be increased, and the experience of users and the security inspector can be improved.

In some other embodiments of the present disclosure, the AR device may further acquire a standard scanned image, a three-dimensional model, and descriptive information of a suspicious object based on suspicious object information. Then, the standard scanned image, the three-dimensional model, and the descriptive information of the suspicious object can be displayed at a predetermined location in an AR manner, so that the security inspector can compare the standard scanned image of the suspicious object with an actual scanned image. For example, if the customs declaration shows that the inspected object is a kind of mobile phone, after the inspected object passes through a security inspection device and an X-ray scanned image of the inspected object is scanned by the security inspection device, it is recognized that the inspected object may be a pistol by a predetermined algorithm. This pistol information is then sent to the AR device. The AR device can acquire a standard scanned image, a three-dimensional model and descriptive information of the pistol, which are then displayed in an AR mode.

That is, in this embodiment, not only the standard scanned image, the three-dimensional model, and the descriptive information of the mobile phone are displayed in an AR manner, but also the standard scanned image, the three-dimensional model, and the descriptive information of the pistol can be displayed simultaneously. The security inspector who is viewing the images can see the standard scanned image of the pistol and the standard scanned image of the mobile phone in an AR manner, and recognize an image having a pistol shape displayed in the current scanned image, so that it can be substantially determined that the inspected object is a pistol, which further improves the accuracy of image screening.

In further embodiments of the present disclosure, the AR device further performs image processing on the standard scanned image corresponding to the registration information of the inspected object or the standard scanned image of the suspicious object in response to an image processing instruction, and displays the processed standard scanned image in an AR manner. For example, histogram equalization, logarithmic transformation, and other processes can be performed on the standard scanned image for image enhancement display, for example, to map a narrow grayscale range displayed in the image previously to a wider grayscale range to increase the image contrast, so that the security inspector can perform image screening conveniently.

In still other embodiments of the present disclosure, the AR device further performs zooming, rotating and other operations on the three-dimensional model corresponding to the registration information of the inspected object or the three-dimensional model of the suspicious object in response to a model processing instruction, and then displays the three-dimensional model subjected to the model operation in an AR manner. For example, the AR device stores a correspondence between user gestures, cargos items, and operation instructions, and performs operations such as zooming, rotating, and the like by recognizing user gestures and cargos items.

Figure 3:
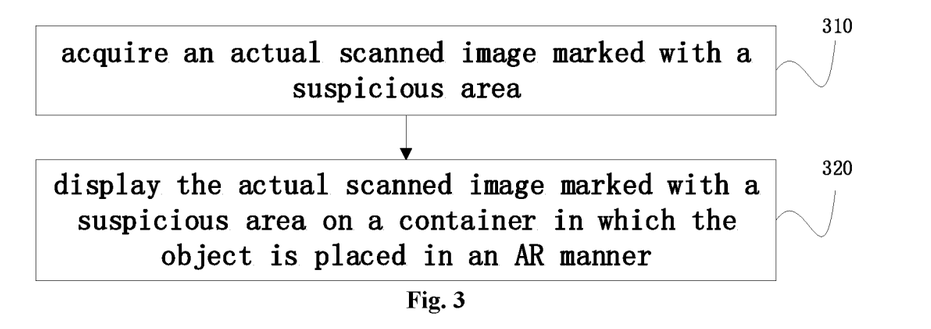
FIG. 3 is a schematic flow chart of a method for assisting security inspection further embodiments of the present disclosure.

FIG. 3 is a schematic flow chart of a method for assisting security inspection further embodiments of the present disclosure.

At step 310, an actual scanned image marked with a suspicious area is acquired, wherein if the inspected object is considered as a suspicious object, a location in the actual scanned image where the inspected object is displayed is marked as a suspicious area. For example, the security inspector can determine that the cargos item is a suspicious object by comparing the standard scanned image of the cargos item with the actual scanned image, mark a suspicious area in the actual scanned image, and send the image to another AR device, so that an inspector wearing the AR device can view the image in unpacking inspection.

At step 320, the actual scanned image marked with a suspicious area is displayed on a container in which the object is placed in an AR manner. In unpacking inspection, an unpacking inspector wearing an AR device can identify the marked suspicious area at a predetermined location in the cargo container in which the cargos item is located, so that the inspector can accurately locate the suspicious object.

In the related art, unpacking inspection and image screening are two stages in security inspection. Although the suspicious area is marked in image screening, in the stage of unpacking inspection, with only an image with a suspicious mark, the inspector can only rely on his/her feeling to make a rough positioning of the suspicious object in the container, which is not accurate enough, and the efficiency of unpacking inspection is lowered. In the present embodiment, during the unpacking inspection, an actual scanned image marked with a suspicious area is displayed on the container where the inspected object is placed in an AR manner, so that the inspector can accurately locate the suspicious object, and the efficiency of unpacking inspection can be improved.

Figure 4:
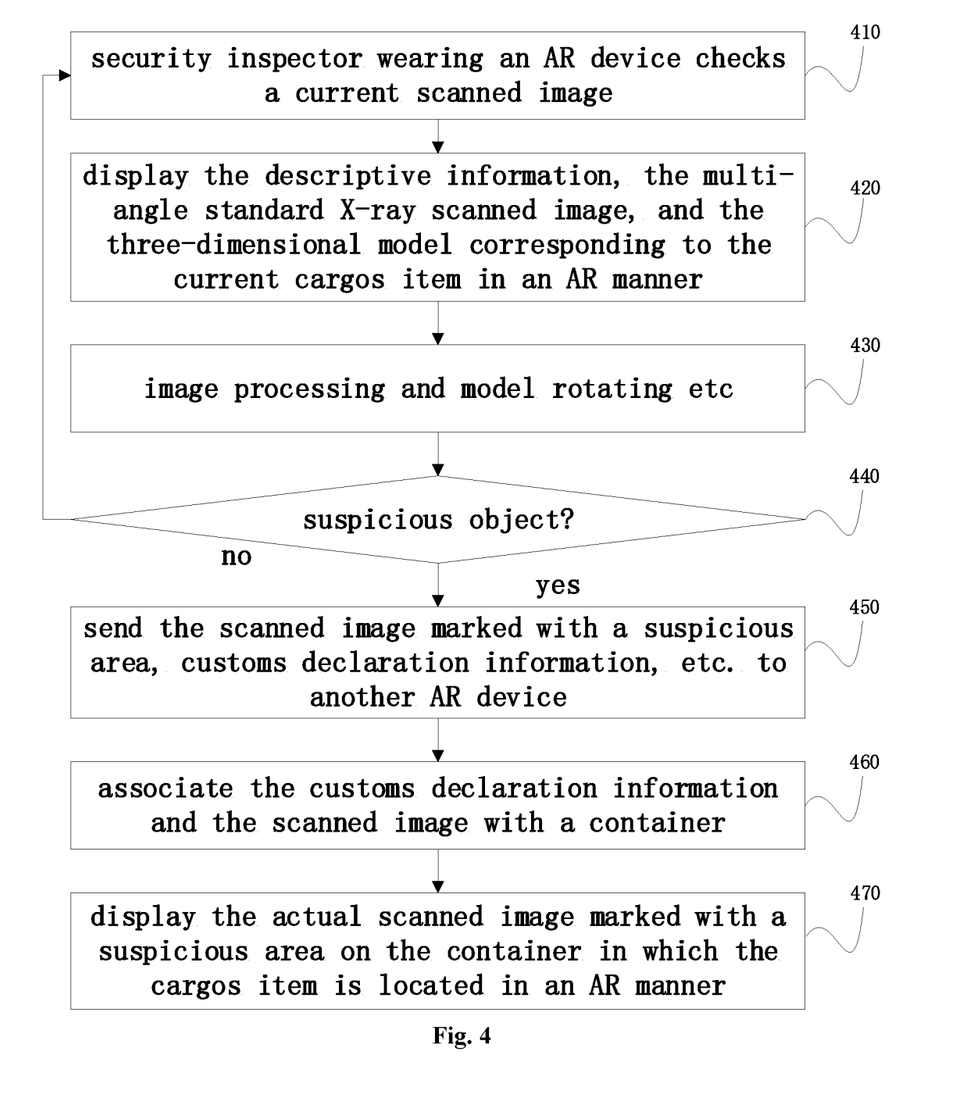
FIG. 4 is a schematic flow chart of a method for assisting security inspection further embodiments of the present disclosure.

FIG. 4 is a schematic flow chart of a method for assisting security inspection further embodiments of the present disclosure. A database and a server may be established in advance. The server stores multi-angle standard X-ray scanned images and three-dimensional models of cargos items. The database stores addresses of the standard scanned images and the three-dimensional models of cargos items, as well as some descriptive information of cargos items.

At step 410, the security inspector wearing an AR device checks a current scanned image. For example, in a case of a container containing a plurality of cargos items, the security inspector may see the scanned image of each cargos item in the container when the container is passing through a security inspection device.

At step 420, the AR device loads descriptive information, multi-angle standard X-ray scanned images, and three-dimensional models corresponding to the current cargos items from the database and server through a network, and displays the descriptive information, the multi-angle standard X-ray scanned images, and the three-dimensional models corresponding to the current cargos items at a specified location in an AR manner. The descriptive information, the multi-angle standard X-ray scanned image and the three-dimensional model corresponding to a cargos item can be displayed at the same location or at different locations.

At step 430, the AR device performs image processing on the multi-angle standard X-ray scanned image or performs zooming, rotating or other operation on the three-dimensional model of a cargos item in response to an image processing instruction or a model processing instruction, and displays the multi-angle standard X-ray scanned image subjected to the image processing or the three-dimensional model subjected to the model operation in an AR manner for reference by the security inspector. For example, the security inspector performs image processing such as histogram equalization or logarithmic transformation on the multi-angle standard X-ray scanned image, or zooms and rotates the three-dimensional model of the cargos item by means of a gesture or voice command. Thus, the security inspector can determine whether a corresponding cargos item is a suspicious object by reference to the image or three-dimensional model displayed in an AR manner.

At step 440, the security inspector determines whether the cargos item is a suspicious object, and if so, step 450 is executed, otherwise, step 410 is executed.

At step 450, the security inspector marks a suspicious area with picture viewing software and sends the scanned image marked with a suspicious area, customs declaration information, etc. to another AR device. In addition, the standard scanned image, three-dimensional model and descriptive information of the cargos item can be sent to another AR device as well.

At step 460, in unpacking inspection, an unpacking inspector wearing the AR device associates the customs declaration information and the scanned image with a container. Security inspector can obtain customs declaration information and an actual scanned image of a current container to be inspected when he/her views scanned images in a room. In this case, the customs declaration information is associated with the actual scanned image. If there is a suspicious area on the actual scanned image, the customs declaration information and the actual scanned image are sent to another AR device worn by an unpacking inspector. The container can be located by means of container number identification, so that the customs declaration information, the scanned image and the container can be associated with each other.

At step 470, the actual scanned image marked with a suspicious area is displayed on the container in which the cargos item is placed in an AR manner. In addition, the standard scanned image, three-dimensional model and descriptive information of the cargos item can also be displayed on the container where the cargos item locates in an AR manner, so that the unpacking inspector can locate the suspicious object conveniently.

In this embodiment, in the image screening stage, an AR device is worn by an image screening inspector to load the descriptive information, standard X-ray scanned image and three-dimensional model corresponding to the current cargos item from a database and server through a network, and display at a designated location in an AR manner, so as to assist the image screening inspector in image screening. In addition, the security inspector can perform image processing such as histogram equalization or logarithmic transformation on the standard X-ray scanned image, or zoom and rotate the three-dimensional model by means of a gesture or voice command. The security inspector's demand for commodity knowledge can be satisfied, the training cost of the security inspector can be reduced. By providing a guide to image screening, the experience of users and the security inspector can be improved. In the unpacking inspection stage, an unpacking inspector wearing an AR device associates the customs declaration information, the scanned image with a container. A suspicious area is displayed in space in an AR manner, so that the inspector can locate a suspicious object conveniently and thereby the efficiency of unpacking inspection can be improved.

In some other embodiments of the present disclosure, in unpacking inspection, a standard scanned image, a three-dimensional model and descriptive information of the suspicious object can also be displayed in an AR manner on the container where the cargos item locates, so that the unpacking inspector can locate the suspicious object more rapidly and learn specific information about the suspicious object.

Figure 5:
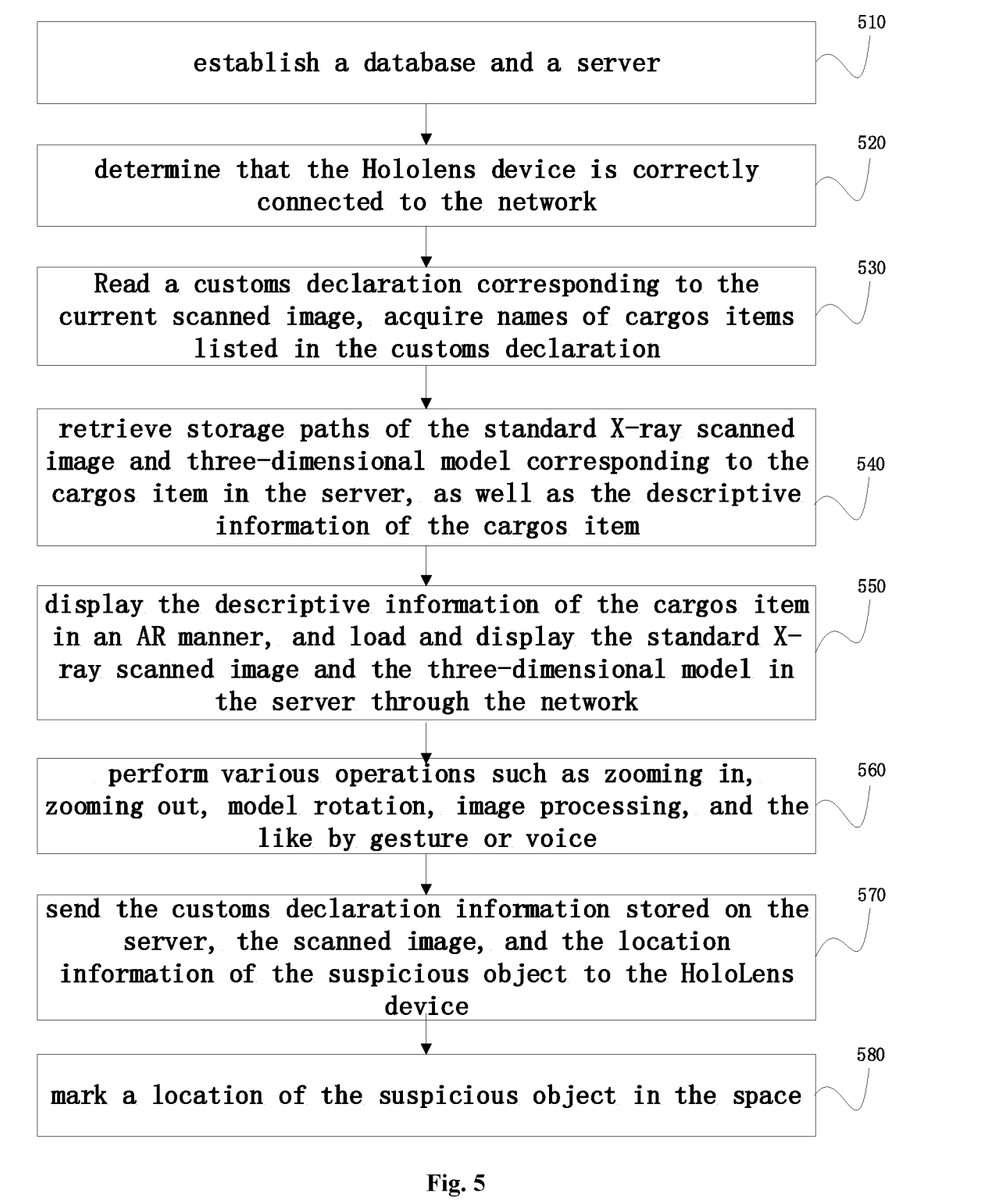
FIG. 5 is a schematic diagram of a method for assisting security inspection according to some application embodiments of the present disclosure.

FIG. 5 is a schematic diagram of a method for assisting security inspection according to some application embodiments of the present disclosure. In this embodiment, description is given with an example in which the AR device is a HoloLens device.

At step 510, a database and server are established, wherein a Tomcat server can be used as the server to store multi-angle standard X-ray scanned images and three-dimensional models of cargos items. A MySQL database can be used as the database to store addresses of the multi-angle standard X-ray scanned images and three-dimensional models of the cargos items in the server, as well as some descriptive information about the cargos items.

At step 520, it is determined that the Hololens device is correctly connected to the network. This device does not require an external power source when used. Upon turning on the device, an inspector can put the focus of field of view to an application on the application interface, and then place his/her hand in the field of view of the Hololens, with the hand clenched, extend the first finger and the thumb and then nip rapidly to complete a click operation.

At step 530, after entering the application, the Hololens device reads a customs declaration corresponding to the current scanned image to acquire names of cargos items listed in the customs declaration.

At step 540, the image screening inspector clicks by using the gesture described in step 520 or directly recites the name of a cargos item to be checked by voice. At this time, the request is processed by a server Servlet, and the pre-established database is searched for the name of the cargos item to retrieve storage paths of the standard X-ray scanned image and three-dimensional model corresponding to the cargos item in the server, as well as the descriptive information of the cargos item.

At step 550, the Hololens device displays the descriptive information of the cargos item in an AR manner, and according to the storage paths obtained in step 540, loads and displays the standard X-ray scanned image and the three-dimensional model in the server through the network.

At step 560, after the standard X-ray scanned image and the three-dimensional model are loaded, the image screening inspector can perform various operations such as zooming in, zooming out, model rotation, image processing, and the like by gesture or voice. For example, if a voice command "histogram equalization" is issued by the image screening inspector and this command is recognized by the Hololens device, a pixel matrix of the standard X-ray scanned image is acquired to perform image processing such as histogram equalization.

At step 570, if a suspicious area is found, the image screening inspector can mark the suspicious area with picture viewing software and send the customs declaration information stored on the server, the scanned image, and the location information of the suspicious object to the HoloLens device. Here, the server-side socket does not locate a specific AR device client socket, but is in a state of waiting for a connection to monitor the network status in real time. A connection request is made by the client's socket to connect to the server-side socket at a specified address and port number. When the client socket connection request is received by the server-side socket, in response to the client socket request, a new thread is created to read the image information and send image information to the client.

At step 580, an unpacking inspector wearing a HoloLens device associates a container to be inspected with the scanned image and customs declaration information by gesture, space mapping, container number identification, image recognition, or GPS positioning, and displays the scanned image and the customs declaration information in an AR manner. According to the suspicious object location information in step 570, a location of the suspicious object is marked in the space.

In this embodiment, in the image screening stage, the security inspector's demand for commodity knowledge can be satisfied, the training cost of the security inspector can be reduced. By providing a guide to image screening, the accuracy of image screening can be increased, and the experience of users and the security inspector can be improved. In the unpacking inspection stage, the container to be inspected can be associated with the customs declaration information and the scanned image, so that the location of the suspicious object can be located accurately, which may improve the efficiency of unpacking inspection.

Figure 6:
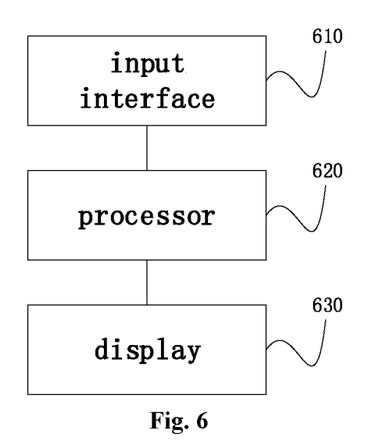
FIG. 6 is a schematic structural view of an apparatus for assisting security inspection according to some embodiments of the present disclosure.

FIG. 6 is a schematic structural view of an apparatus for assisting security inspection according to some embodiments of the present disclosure. The apparatus for assisting security inspection may be an AR device, including an input interface 610, a processor 620, and a display 630, wherein:

the input interface 610 is configured to acquire registration information of an inspected object; the inspected object may be a specific cargos item in a container, wherein the container may be, for example, a vehicle, a container case, a package, or the like.

In the inspection of a container case, names of cargos items listed in the customs declaration can be obtained by checking the customs declaration, and the names of cargos items are the registration information of the cargos items.

The processor 620 is configured to acquire a standard scanned image corresponding to the registration information of the inspected object. Multi-angle standard X-ray scanned images of various cargos items can be stored in memory in advance, and the multi-angle standard X-ray scanned image of a cargos item can be retrieved from the memory by the name of the cargos item. For example, if the customs declaration shows that there is a brand of mobile phone in a container case being checked, a corresponding multi-angle standard X-ray scanned image can be retrieved by the name of the brand of mobile phone.

The display 630 is configured to display the standard scanned image corresponding to the registration information in an AR manner, so as to determine whether the inspected object is a suspicious object through comparing the standard scanned image with an actual scanned image, wherein, the actual scanned image comprises an image of the inspected object. For example, when a cargo container is passing through a security inspection device, a security inspector wearing an AR device can see a multi-angle standard X-ray scanned image of a cargos item in the cargo container at a predetermined location by means of the AR device. At the same time, the security inspector can also see a current X-ray scanned image containing the cargos item in the cargo container. By comparing the multi-angle standard X-ray scanned image of the cargos item with the current X-ray scanned image, it can be determined whether the cargos item is a suspicious object.

In this embodiment, through acquiring a standard scanned image corresponding to the registration information based on the registration information of the object and displaying it in an AR manner, a security inspector can determine whether the inspected object is a suspicious object by comparing the standard scanned image with an actual scanned image. The security inspector's demand for cargos knowledge can be satisfied, by providing a guide to image screening, the accuracy of image screening can be improved.

In some other embodiments of the present disclosure, the processor 620 may be further configured to acquire a standard scanned image, a three-dimensional model, and descriptive information corresponding to the registration information of the inspected object. The descriptive information comprises the name, quantity, definition, use, characteristic parts on the scanned image, commonly used packaging materials of the inspected object, and the like.

The display 630 is configured to display the standard scanned image, the three-dimensional model, and the descriptive information at a predetermined location in an AR manner. The security inspector can compare the current scanned image with the standard scanned image to determine whether they are consistent with each other, and check the three-dimensional model and descriptive information to comprehensively determine whether the inspected object is a suspicious object. For example, if the customs declaration shows that the inspected object is a kind of mobile phone, the security inspector wearing an AR device can view the standard scanned image, the three-dimensional model and the descriptive information of the mobile phone at a predetermined location. However, if a pistol shape is shown in the current scanned image, it is determined that the inspected object does not match the information of the customs declaration, and the inspected object may be a suspicious object.

In this embodiment, the standard scanned image, the three-dimensional model and the descriptive information are displayed at a predetermined location in an AR manner, which can assist the security inspector in image screening, satisfy the security inspector's demand for commodity knowledge, and reduce the training cost of the security inspector. By providing a guide to image screening, the accuracy of image screening can be increased, and the experience of users and the security inspector can be improved.

In further embodiments of the present disclosure, the processor 620 is further configured to acquire a standard scanned image, a three-dimensional model, and descriptive information of a suspicious object based on suspicious object information. The display 630 is further configured to display the standard scanned image, the three-dimensional model, and the descriptive information of the suspicious object at a predetermined location in an AR manner, so that the security inspector can compare the standard scanned image of the suspicious object with an actual scanned image conveniently and thus the accuracy of image screening can be increased.

In further embodiments of the present disclosure, the processor 620 is further configured to perform image processing on the standard scanned image corresponding to the registration information and the standard scanned image of the suspicious object in response to an image processing instruction, and the display 630 is configured to display the processed standard scanned image in an AR manner. For example, histogram equalization, logarithmic transformation, and other processes can be performed on the standard scanned image for image enhancement display, for example, to map a narrow grayscale range displayed in the image previously to a wider grayscale range to increase the image contrast, so that the security inspector can perform image screening conveniently.

In still other embodiments of the present disclosure, the processor 620 is further configured to perform zooming, rotating and other operations on the three-dimensional model corresponding to the registration information and the three-dimensional model of the suspicious object in response to a model processing instruction, and the display 630 is configured to display the three-dimensional model subjected to the model operation in an AR manner. For example, the AR device stores a correspondence between user gestures, cargos items, and operation instructions, and the processor 630 performs operations such as zooming, rotating, and the like by recognizing user gestures and cargos items.

In still other embodiments of the present disclosure, the input interface 610 is further configured to acquire an actual scanned image marked with a suspicious area, wherein if the inspected object is a suspicious object, a location where the image of the inspected object is displayed in the actual scanned image is marked as the suspicious area; For example, the security inspector can determine that a cargos item is a suspicious object by comparing the standard scanned image of the cargos item with the actual scanned image, mark a suspicious area in the actual scanned image, and send the image to another AR device, so that an inspector wearing the AR device can view the image in unpacking inspection.

The display 630 is further configured to display the actual scanned image marked with the suspicious area on a container in which the inspected object is placed in the AR manner. In unpacking inspection, an unpacking inspector wearing an AR device can identify the marked suspicious area at a predetermined location in the cargo container in which the cargos item is located, so that the inspector can accurately locate the suspicious object.

The display 630 is further configured to display the standard scanned image, three-dimensional model and descriptive information of the inspected object or the suspicious object on the container where the inspected object locates in an AR manner, so that the unpacking inspector can locate the suspicious object conveniently.

In this embodiment, in unpacking inspection, an actual scanned image marked with a suspicious area is displayed on the container in which the inspected object is placed in an AR manner, so that an inspector can accurately locate the suspicious object and thereby the efficiency of the unpacking inspection is increased.

Figure 7:
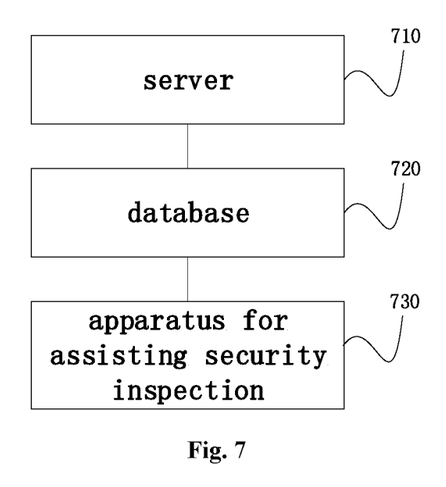
FIG. 7 is a schematic structural view of a system for assisting security inspection according to some embodiments of the present disclosure.

FIG. 7 is a schematic structural view of a system for assisting security inspection according to some embodiments of the present disclosure. The system for assisting security inspection comprises a server 710, a database 720, and an apparatus for assisting security inspection 730, wherein the apparatus for assisting security inspection 730 may be an AR device and has been described in detail in the above embodiments.

The server 710 is configured to store standard scanned images and three-dimensional models of cargos items, and the database 720 is configured to store addresses of the standard scanned images and the three-dimensional models of cargos items in the server, as well as descriptive information. The cargos item may be a cargos item in the registration information or a cargos item actually detected.

The apparatus for assisting security inspection 730 can acquire the standard scanned image, three-dimensional model and descriptive information corresponding to the registration information from the database 720 and the server 710, and display it in an AR manner. If the inspected object is identified as a suspicious object by the security inspection device, the apparatus for assisting security inspection 730 can also acquire the standard scanned image, three-dimensional models and descriptive information of the suspicious object, and display it in an AR manner. So that, the security inspector can perform image recognition with increased accuracy of image screening and improved efficiency of unpacking inspection.

Figure 8:
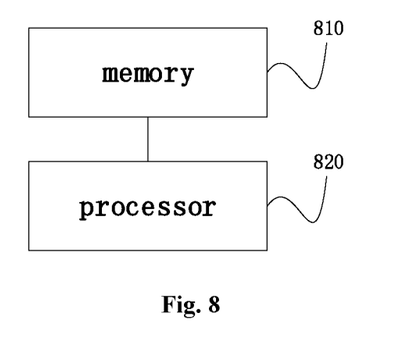
FIG. 8 is a schematic structural view of an apparatus for assisting security inspection according to some other embodiments of the present disclosure.

FIG. 8 is a schematic structural view of an apparatus for assisting security inspection according to some other embodiments of the present disclosure. The apparatus for assisting security inspection comprises memory 810 and processor 820. The memory 810 may be a magnetic disk, flash memory or any other non-volatile storage medium. The memory 810 is configured to store instructions of the corresponding the embodiments of the FIGS. 1-5. The processor 820 is coupled to memory 810 and may be implemented as one or more integrated circuits, such as a microprocessor or microcontroller. The processor 820 is configured to execute instructions stored in the memory.

Figure 9:
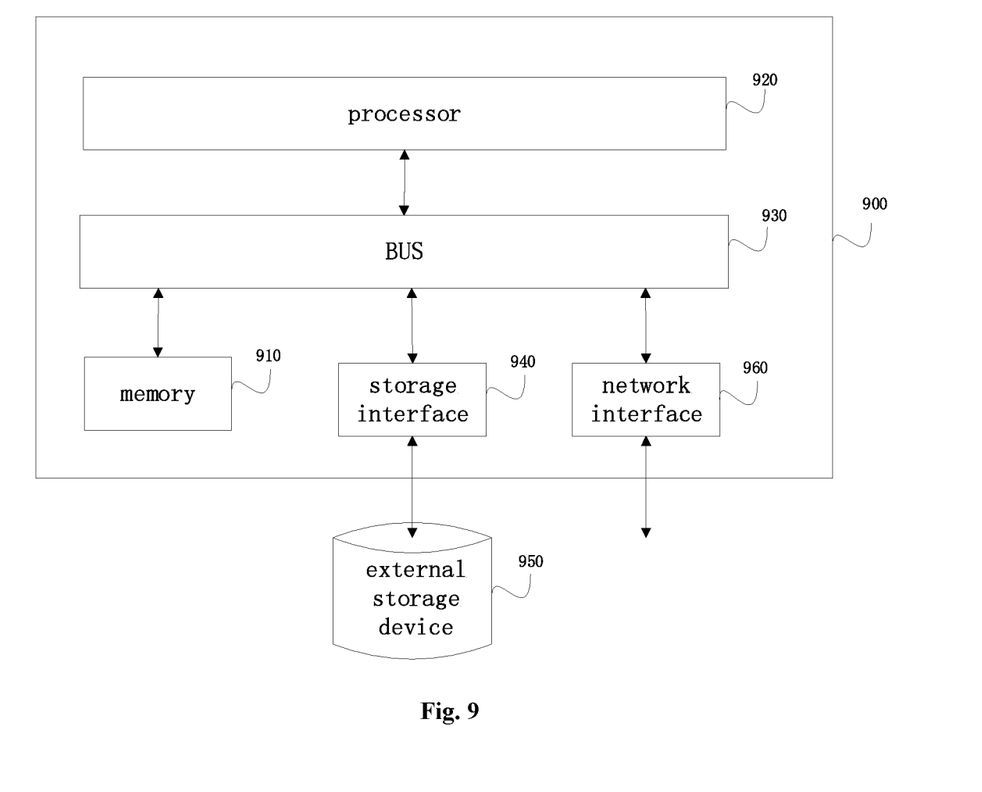
FIG. 9 is a schematic structural view of an apparatus for assisting security inspection according to further embodiments of the present disclosure.

In some embodiments, as illustrated in FIG. 9, the apparatus for assisting security inspection 900 comprises memory 910 and a processor 920. The processor 920 is coupled to the memory 910 via a BUS 930. The apparatus for assisting security inspection 900 may be further connected to an external storage device 950 through a storage interface 940 to access external data, and may be further connected to a network or another computer system (not shown) through a network interface 960, the details of which will not described herein.

In this embodiment, through storing data instructions in memory and processing the above instructions using a processor, the accuracy of image screening can be increased. In addition, it can help the security inspector in accurately locating a suspicious object, so that the efficiency of unpacking inspection is improved.

In other embodiments, the present disclosure further provides a computer-readable storage medium having computer program instructions stored thereon that, when executed by a processor, implement the steps of the methods of corresponding embodiments shown in FIGS. 1-5. One skilled in the art should understand that, the embodiments of the present disclosure may be provided as a method, an apparatus, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (including but not limited to disk storage, CD-ROM, optical memory, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture including instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

Heretofore, the present disclosure has been described in detail. In order to avoid obscuring the concepts of the present disclosure, some details known in the art are not described. Based on the above description, those skilled in the art can understand how to implement the technical solutions disclosed herein.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified without departing from the scope and spirit of the present disclosure. The scope of the disclosure is defined by the following claims.

What is claimed is:

1. A method for assisting security inspection, comprising:
   acquiring registration information of an inspected object within a container, wherein the registration information comprises a name of an item;
   acquiring a standard scanned image corresponding to the registration information;
   acquiring an actual scanned image of the inspected object within the container;
   displaying the standard scanned image in an Augmented Reality (AR) manner to determine whether the inspected object is a suspicious object through determining whether the standard scanned image and the actual scanned image are consistent with each other.

2. The method for assisting security inspection according to claim 1, further comprising:

acquiring at least one of a three-dimensional model or descriptive information corresponding to the registration information;

displaying the at least one of the three-dimensional model or the descriptive information corresponding to the registration information in an AR manner.

3. The method for assisting security inspection according to claim 1, further comprising:

acquiring the actual scanned image marked with a suspicious area, wherein if the inspected object is a suspicious object, a location at which the image of the inspected object is displayed in the actual scanned image is marked as the suspicious area;

displaying the actual scanned image marked with the suspicious area in an AR manner on the container.

4. The method for assisting security inspection according to claim 2, further comprising:

displaying at least one of the standard scanned image, the three-dimensional model, or the descriptive information corresponding to the registration information on the container in which the inspected object is placed in an AR manner.

5. The method for assisting security inspection according to claim 1, further comprising:

acquiring at least one of a standard scanned image, a three-dimensional model or descriptive information of the suspicious object;

displaying the at least one of the standard scanned image, the three-dimensional model or the descriptive information of the suspicious object in an AR manner.

6. The method for assisting security inspection according to claim 5, further comprising:

performing image processing on the at least one of the standard scanned image corresponding to the registration information or the standard scanned image of the suspicious object in response to an image processing instruction, and displaying the processed standard scanned image in an AR manner.

7. The method for assisting security inspection according to claim 5, further comprising:

performing at least one of a zooming operation or a rotating operation on the at least one of the three-dimensional model corresponding to the registration information or the three-dimensional model of the suspicious object in response to a model processing instruction, and displaying the three-dimensional model subjected to the model operation in an AR manner.

8. The method for assisting security inspection according to claim 1, wherein the standard scanned image is a multi-angle standard X-ray scanned image.

9. An apparatus for assisting security inspection, comprising:

an input interface configured to acquire registration information of an inspected object within a container, wherein the registration information comprises a name of an item;

a processor configured to acquire an actual scanned image of the inspected object within the container, and configured to acquire a standard scanned image corresponding to the registration information; and a display configured to display the standard scanned image in an Augmented Reality (AR) manner to determine whether the inspected object is a suspicious object through determining whether the standard scanned image and the actual scanned image are consistent with each other.

10. The apparatus for assisting security inspection according to claim 9, wherein:

the processor is further configured to acquire at least one of a three-dimensional model or descriptive information corresponding to the registration information;

the display is further configured to display the at least one of the three-dimensional model or the descriptive information corresponding to the registration information in an AR manner.

11. The apparatus for assisting security inspection according to claim 9, wherein:

the input interface is further configured to acquire the actual scanned image marked with a suspicious area, wherein if the inspected object is a suspicious object, a location at which the image of the inspected object is displayed in the actual scanned image is marked as the suspicious area;

the display is further configured to display the actual scanned image marked with the suspicious area in an AR manner on the container.

12. The apparatus for assisting security inspection according to claim 10, wherein:

the display is further configured to display at least one of the standard scanned image, the three-dimensional model, or the descriptive information corresponding to the registration information on the container in which the inspected object is placed in an AR manner.

13. The apparatus for assisting security inspection according to claim 9, wherein:

the processor is further configured to acquire at least one of a standard scanned image, a three-dimensional model or descriptive information of the suspicious object;

the display is further configured to display the at least one of the standard scanned image, the three-dimensional model or the descriptive information of the suspicious object in an AR manner.

14. The apparatus for assisting security inspection according to claim 13, wherein:

the processor is further configured to perform image processing on the at least one of the standard scanned image corresponding to the registration information or the standard scanned image of the suspicious object, in response to an image processing instruction;

the display is further configured to display the processed standard scanned image in an AR manner.

15. The apparatus for assisting security inspection according to claim 13, wherein:

the processor is further configured to perform at least one of a zooming operation or a rotating operation on the at least one of the three-dimensional model corresponding to the registration information or the three-dimensional model of the suspicious object, in response to a model processing instruction;

the display is further configured to display the three-dimensional model subjected to the model operation in an AR manner.

16. The apparatus for assisting security inspection according to claim 9, wherein the standard scanned image is a multi-angle standard X-ray scanned image.

17. A system for assisting security inspection, comprising a server, a database and the apparatus for assisting security inspection according to claim 9.

18. The system for assisting security inspection according to claim 17, wherein:

the server is configured to store at least one of standard scanned images or three-dimensional models;

the database is further configured to store addresses of the standard scanned images and the three-dimensional models in the server, as well as descriptive information corresponding to the registration information and descriptive information of the suspicious objects.

19. A device for assisting security inspection, comprising:

a memory; and a processor coupled to the memory, the processor configured to carry out the method for assisting security inspection according to claim 1 based on instructions stored in the memory.

20. A non-transitory computer-readable storage medium on which computer program instructions are stored, which when executed by a processor implement the steps of the method for assisting security inspection according to claim 1.

* * * * *